2,386,922

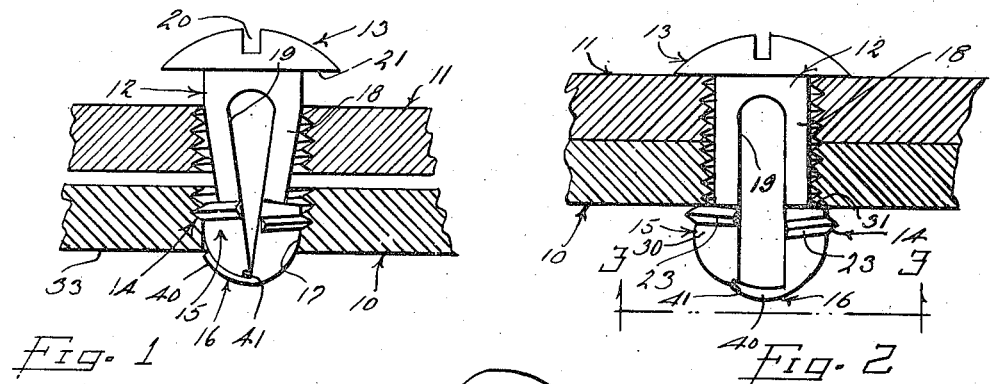
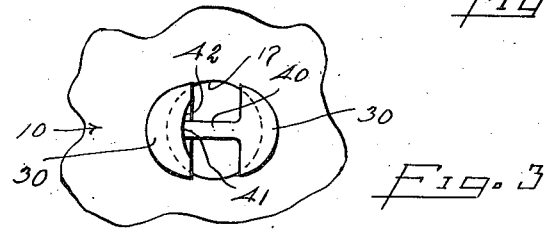
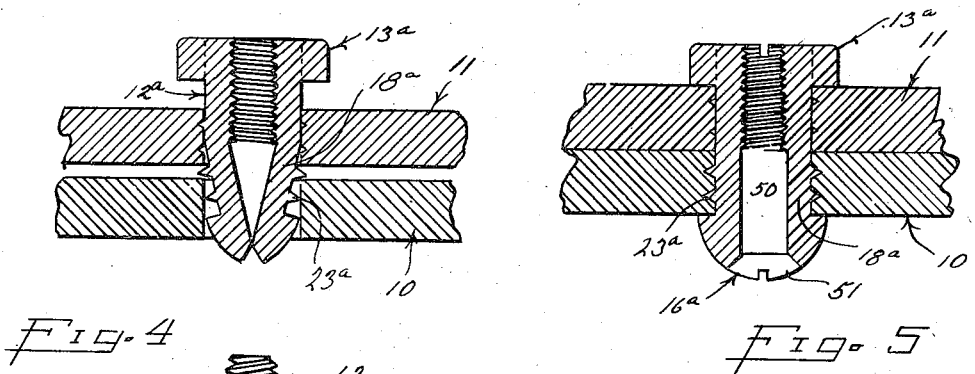
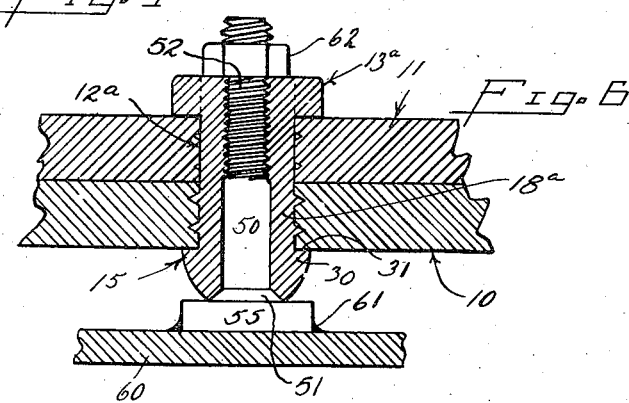
INVENTORS
Earle R. Andrews
BY and Lionel H. Steans
HIS ATTORNEY Patented Oct. 16, 1945

UNITED STATES PATENT OFFICE 2,386,922

FASTENING DEVICE

Earle R. Andrews and Lionel H. Steans, Los Angeles, Calif.

Application June 16, 1943, Serial No. 490,982

12 Claims. (Cl. 85—2)

This invention relates to a fastening device for use where rivets, bolts and like fasteners are commonly used. It is a general object of this invention to provide a fastening device of the general character referred to that is extremely simple of manufacture and also of use, and which is effective as a holding device and extremely inexpensive of manufacture.

The device provided by this invention is useful in various situations. For instance, it may be used for applying one part to another, or for joining or tying together two parts, such for example as two sheets or bodies of material. Its most general and common use is probably in connection with work which comprises two or more parts or elements to be joined, and which require a fastening device such as has the general characteristics of a rivet or a bolt. It is to be understood that when we refer to the work to which the present device can be applied we do not limit the use of the device to any particular material, number of parts, or such details. However, for sake of example, we will, throughout this disclosure, refer to the device as applied to work comprising two elements, an inner element and an outer element, required to be joined or tied together.

An object of our invention is to provide a fastening device of the general character referred to which is extremely simple of construction. The device of the present invention is an integral or one-piece structure that requires very little work in its formation and which is suited for quantity production.

Another object of this invention is to provide a fastening device of the character mentioned operable from one end or from the outer face of the outermost element of the work. With the device of the present invention it is unnecessary to employ a nut or backing-up tool or other device at the inner side of the work, as is common in the case of bolts and rivets.

Another object of this invention is to provide a fastening device which operates to draw the work together, that is, to draw the elements of the work up together in the course of application of the device, so that the work is held tight when the device takes its final position.

Another object of this invention is to provide a fastening device of the character mentioned which involves a primary lock operated by reason of the resiliency of the stock out of which the device is formed and which operates to hold the work locked together against separation due to vibration or other causes such as frequently result in failure of bolted sections.

Another object of the invention is to provide a simple, practical and effective device useful for application to a work element to serve as a means for attaching an object to that element.

It is a further object of this invention to provide a device of the character mentioned with a safety lock which automatically engages when the primary lock moves into operating position, the safety lock acting so that the device can only be released by positive and deliberate operation and cannot under any circumstances be dislodged accidentally.

The various objects and features of our invention will be fully understood from the following detailed description of typical preferred forms and applications of the invention, throughout which description reference is made to the accompanying drawing, in which:

Fig. 1 is a side elevation of a fastening device embodying our invention, showing it being applied to two elements of work, the work being shown in section. Fig. 2 is a view similar to Fig. 1 showing the work finally clamped tight by the device, showing the primary and safety locks both in full operative position. Fig. 3 is a view taken as indicated by line 3—3 on Fig. 2. Fig. 4 is a view similar to Fig. 1 showing a modified form of construction embodying features of the present invention. Fig. 5 is a view similar to Fig. 2 showing the form of the invention illustrated in Fig. 4, and Fig. 6 is a view illustrating a modified form of the invention having additional parts applied thereto, as will be hereinafter described.

The safety device provided by our invention is shown in connection with work comprising what we will term an inner element 10 and an outer element 11 which work elements are required to be drawn tight together and be clamped in such position as shown in Fig. 2 of the drawing.

The device of the present invention includes, generally, a body or shank 12, a head 13 on the outer end of the shank to engage the outer work element 11, means on the shank whereby the elements of the work are brought tight together as the device is applied thereto, primary lock means 15 for holding the work in clamped position when the device is operated to the final position, and safety lock means 16 supplementing the primary lock means providing a double lock for the device, so that it cannot, under any circumstances, become accidentally dislodged or disengaged.

The shank 12 of the device is an elongate structure designed to extend through openings 17 pre-formed through the work elements 10 and 11. In its normal or expanded position the body is designed to snugly fit the openings 17. In accordance with the present invention the shank is split or divided longitudinally from its inner end to a point at or close to its outer end in order to form it into two spaced legs 18. The split or bifurcation is such, and the material out of which the device is formed is such as to give the legs resiliency sufficient to allow them to be contracted or sprung together as the device is applied to the work in the manner shown in Fig. 1. It will be obvious that the exact length, size and proportioning of the cut or slot 19 provided in the shank to form the spaced legs 18 may, in practice, vary widely, depending upon the proportioning of the device, the material out of which it is formed, and various like factors.

The head 13 is formed integral with the outer end of the shank 12. In the form of the invention illustrated in Figs. 1 and 2 the head is shown round and provided with a screw-driver slot 20 so that it resembles, generally, the head of a round-headed screw. The head, in practice, is made sufficiently large and is so shaped and finished as to present a clamping face or shoulder 21 designed to engage the outer surface of the outer work element 11.

The means 14 provided on the shank 12 for drawing the work elements tightly together is preferably in the form of a helically pitched or thread-like tooth on the shank, or on a part formed thereon. In the preferred form of the invention, as shown in Fig. 1, there is a tooth segment 23 on each leg of the shank and each tooth segment is formed so that it projects from the shank and is sharp in order to cut its way through the work elements as will be hereinafter described. In the particular instance illustrated the tooth elements 23 are not formed directly on the shank but are formed on the primary lock means, as will be hereinafter described. However, since the parts are all formed integrally it may be considered that the tooth elements are in reality carried on or by the legs of the shank, the actual construction being that they are so carried through the medium of the lock lugs hereinafter referred to.

When the device is applied to the work, that is, when it is started through the outer element 11 of the work, the extreme outer end portions of the legs are guided into the contracted position so that they enter the opening in the element 11 until the jaw segments 23 engage the work. Continued application of the device, that is, pressure of the device against the work and turning of it causes the teeth to cut into the work and, in effect, thread themselves through the work. In Fig. 1 the device is shown partially applied, in which case the teeth have cut completely through the outer element 11 of the work and are partially through the inner element. For the purpose of illustration the teeth are shown fairly large and as though they have cut definite thread-like grooves in the work. It is to be understood, in practice, that the teeth may be smaller, it merely being sufficient to provide teeth which will operate to feed the device through the work in a manner to finally bring the work to the position shown in Fig. 2. As the device is applied to the work, if the two work elements are apart, the head 13 will finally bear on the outer work element 11, after which continued rotation of the device causes the inner work element 10 to be drawn to the outer work element.

The primary lock means for holding the device secure involves an enlargement on the shank, preferably in the form of lugs 30 projecting outwardly or radially from the outer end portion of each leg to present shoulders 31. The lugs 30 are integral with the legs and, as above described, the teeth 23 are in turn formed integrally on the outer surfaces of the lugs. The shoulders 31 of the lugs are related or spaced relative to the shoulder 21 of the head 13 so that when the work elements reach the finally tight position shown in Fig. 2 the lugs are beyond or out of the opening 17 of the inner work element 10, allowing the shoulders 31 to engage behind and bear against the inner surface 33 of the inner work element 10, as clearly shown in Fig. 2. The lugs 30 are moved into active or out position, shown in Fig. 2, by reason of the resiliency of the shank which tends to normally hold the legs in the position shown in Fig. 2.

The safety lock means supplements the locking action of the lugs 30 by positively holding the legs 18 of the shank apart, as shown in Fig. 2. The safety lock preferably includes a spreader or tongue 40 projecting from one leg 18 of the shank to cooperate with a shoulder 41 on the other leg, as shown in Fig. 2. The shoulder 41 is formed by providing a notch 42 in the last mentioned leg, as shown in Fig. 1. The tongue 40 is formed so that it normally bears inwardly against the outer end portion of the notched leg 18.

The tongue 41 acts like a leaf spring or spring latch and its length is related to the shoulder 41 so that when the device reaches the fully engaged position, as shown in Fig. 2, the tongue drops into the notch 42 to engage the shoulder 41. To disengage the device after it has been thus locked by the safety lock it is necessary to positively and deliberately disengage the safety lock and then to contract or depress the legs against the resiliency thereof, thus requiring two deliberate operations that cannot be performed accidentally.

In the modified form of the invention shown in Fig. 4 the shank 12ᵃ has spaced legs 18ᵃ and the head 13ᵃ instead of being a notched round head is more in the nature of the head of a common bolt. It may, in practice, be hexagonal in cross sectional configuration so that it is designed to be engaged by a wrench. In this form of the invention the means provided for drawing the work elements together may be in the nature of teeth 23ᵃ on the outer surfaces of the legs inward of the primary lock. In the particular case illustrated two teeth 23ᵃ are provided on each leg and, by being located inward of the primary lock means the teeth remain in engagement with the work and thus aid in holding it in place, as will be apparent from Figs. 5 and 6 of the drawing.

The safety lock means 16ᵃ provided in this form of the invention is in the nature of a spreader applied to the work after the primary lock means has become engaged.

The spreader is in the nature of a screw element 50 having a conical head 51 to engage between the outer ends of the legs 18ᵃ and having a threaded portion 52 engaged in a threaded opening in the outer end of the shank and the head 13ᵃ, as shown in Fig. 4.

In the case illustrated in Fig. 6, the conical head 51 has an extension or portion 55 which serves as a means by which a part 60 may be attached to the device, as by welding 61, or the like. Further, the spreader 50 in this case projects through and beyond the head 13ᵃ to carry a lock nut 62. With this construction the device may be applied to the parts 10 and 11 as a means for anchoring or applying other parts thereto. For instance, after the device has been applied to one or more parts such as 10 and 11 a separate and distinct part 60 may be supported, applied or attached by means of the spreader and the construction above described.

With the construction just described the fastening device itself is applied and automatically engages to hold the work elements 10 and 11 together and thereafter the spreader 50 and, if desired, added parts such as the part 60, can be fastened to the work by means of the spreader and can be locked there by means of the lock nut 62.

The form of the invention shown in Figs. 4 to 6, inclusive, is particularly adapted to use in connection with soft materials, such as plastics or soft metals.

Having described only typical preferred forms and applications of our invention, we do not wish to be limited or restricted to the specific details herein set forth, but wish to reserve to ourselves any variations or modifications that may appear to those skilled in the art or fall within the scope of the following claims:

Having described our invention, we claim:

1. A screw-type fastening device of the character described including, a shank including spaced legs to extend through inner and outer work parts to be fastened together, a head on the outer end of the shank having means to be engaged by a tool for rotating the shank, helically pitched parts projecting from the exterior of the legs and confined to the inner end portion of the legs to have thread-like engagement with the inner work part whereby the work parts are drawn together by rotation of the device, and a lock shoulder on the inner end of the shank to prevent disengagement of the device from the work parts.

2. A screw-type fastening device of the character described including, a shank including spaced legs to extend through inner and outer work parts to be fastened together, a head on the outer end of the shank shaped to be engaged and rotated by a tool, pitched thread-like teeth confined to the inner end portion of the shank and projecting outwardly from the legs to have thread-like engagement with the inner work part whereby the work parts are drawn together by rotation of the device, and a lock shoulder on the inner end of the shank to prevent disengagement of the device from the work parts.

3. A screw-type one-piece fastening device of the character described including, a shank including spaced legs to extend through inner and outer work parts to be fastened together, a head on the outer end of the shank to be engaged by a tool for rotation, a helically pitched tooth on the exterior of each leg located to have thread-like engagement with the inner work part, and a lock on the inner end of the shank to prevent disengagement of the device from the work including a lug on each leg, the lugs being located inward beyond the teeth and having outwardly facing shoulders to engage the inner work part.

4. A one-piece fastening device of the character described including, a shank including spaced legs to extend through work to be fastened, a head on the outer end of the shank, a lock on the inner end of the shank to prevent disengagement of the device from the work, and a safety lock engaged between the legs holding the legs apart and in position where the lock is engaged to hold the device in the work.

5. A one-piece fastening device of the character described including, a shank including spaced legs to extend through work to be fastened, a head on the outer end of the shank, a lock on the inner end of the shank to prevent disengagement of the device from the work, and a safety lock holding the legs in position where the lock is engaged to hold the device in the work, the safety lock including a tongue on one leg cooperating with the other leg.

6. A fastening device of the character described including, a shank including spaced legs to extend through work to be fastened, a head on the outer end of the shank, a lock on the inner end of the shank to prevent disengagement of the device from the work, and a tongue on one leg to cooperate with a shoulder on the other leg to hold the legs apart with the lock engaged.

7. A fastening device of the character described including, a shank including spaced legs to extend through work to be fastened, a head on the outer end of the shank, a lock on the inner end of the shank to prevent disengagement of the device from the work, and means for holding the legs with the lock engaged including a spreader threaded to the shank and engaged between the legs.

8. A fastening device of the character described including, a shank including spaced legs to extend through work to be fastened, a head on the outer end of the shank, a lock on the inner end of the shank to prevent disengagement of the device from the work, and means for holding the legs with the lock engaged including a spreader engaged between the legs, means securing the spreader in engagement with the legs, the spreader having a projection to receive a second work element.

9. A fastening device including an elongate shank having two spaced legs, a head on the shank, there being an opening longitudinally through the shank and head, lugs on the legs to lock the device to the work, a spreader for the legs extending through the opening, a head on the spreader to engage the legs, and a nut on the spreader to engage the first mentioned head.

10. A fastening device including an elongate shank having two spaced legs, a head on the shank, there being an opening longitudinally through the shank and head, lugs on the legs to lock the device to the work, a spreader for the legs extending through the opening, a head on the spreader to engage the legs, and a nut on the spreader to engage the first mentioned head.

11. A screw-type fastening device of the character described including, a shank including spaced legs to extend through work to be fastened, a head on the outer end of the shank having means to be engaged by a tool for rotating the shank, pitched parts projecting from the exterior of the legs and confined to the inner end portion of the legs whereby elements of the work are drawn together by rotation of the device, a lock shoulder on the inner end of the shank to prevent disengagement of the device from the work, and means permanently associated with the inner end portion of the shank when in assembled position holding the legs apart with the shoulder in cooperative engagement with the work.

12. A screw-type fastening device of the character described including, a shank including spaced legs to extend through work to be fastened, a head on the outer end of the shank shaped to be engaged and rotated by a tool, pitched thread-like teeth confined to the inner end portion of the shank and projecting outwardly from the legs whereby elements of the work are drawn together by rotation of the device, a lock shoulder on the inner end of the shank to prevent disengagement of the device from the work, and an element integral with one leg, engaging the other leg, and acting between the legs to hold them apart with the shoulder in position to engage the work.

EARLE R. ANDREWS.
LIONEL H. STEANS.